(12) United States Patent
Yi et al.

(10) Patent No.: US 9,639,826 B2
(45) Date of Patent: May 2, 2017

(54) MOBILE TERMINAL AND MEMO MANAGEMENT METHOD THEREOF

(75) Inventors: Ilbyoung Yi, Seoul (KR); Byoungkwon Lee, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 856 days.

(21) Appl. No.: 13/187,628

(22) Filed: Jul. 21, 2011

(65) Prior Publication Data
US 2012/0064947 A1 Mar. 15, 2012

(30) Foreign Application Priority Data

Sep. 9, 2010 (KR) .......................... 10-2010-0088590

(51) Int. Cl.
*H04B 1/38* (2015.01)
*G06Q 10/10* (2012.01)
*G06F 3/0483* (2013.01)
*G06Q 10/00* (2012.01)
*H04M 1/725* (2006.01)

(52) U.S. Cl.
CPC ........... *G06Q 10/10* (2013.01); *G06F 3/0483* (2013.01); *G06Q 10/00* (2013.01); *H04M 1/72522* (2013.01); *H04M 2250/22* (2013.01)

(58) Field of Classification Search
USPC .................................. 455/550.1, 556.2, 566
See application file for complete search history.

(56) References Cited

U.S. PATENT DOCUMENTS

| 5,821,931 A | 10/1998 | Berquist et al. |
| 6,519,479 B1 * | 2/2003 | Garudadri ............... G10L 15/22 379/142.01 |
| 7,366,547 B2 * | 4/2008 | Hasegawa ......... H04M 1/72547 379/419 |
| 7,698,644 B2 | 4/2010 | Hawk et al. |
| 8,134,592 B2 * | 3/2012 | Ozawa .............. G06F 17/30817 348/61 |

(Continued)

FOREIGN PATENT DOCUMENTS

| CN | 1114068 A | 12/1995 |
| CN | 1592469 A | 3/2005 |

(Continued)

*Primary Examiner* — Anthony Addy
*Assistant Examiner* — Matthew Genack
(74) *Attorney, Agent, or Firm* — Birch, Stewart, Kolasch & Birch, LLP

(57) ABSTRACT

A method of controlling a mobile terminal including executing, via a controller of the mobile terminal, an application; displaying, via a display unit of the mobile terminal, a display screen including information output by the executing application; displaying, via the display unit, a memo writing window on the display screen including the information output by the executing application; receiving, via the controller, a memo written in the memo writing window; linking, via the controller, the written memo to the information displayed in the display screen when the memo was written in the memo writing window; storing, via a memory of the mobile terminal, the linked memo and information; and re-displaying the memo linked with the information on the display screen if the application is re-executed.

28 Claims, 19 Drawing Sheets

(56) References Cited

U.S. PATENT DOCUMENTS

| | | | |
|---|---|---|---|
| 8,222,994 B1* | 7/2012 | Sagar | H04M 1/72566 340/6.1 |
| 8,493,344 B2* | 7/2013 | Fleizach | G06F 3/04883 345/173 |
| 2004/0187103 A1* | 9/2004 | Wickham | G06F 8/65 717/168 |
| 2004/0257921 A1* | 12/2004 | Nishimura | G06F 1/1616 369/30.08 |
| 2005/0050032 A1 | 3/2005 | Lee | |
| 2006/0239248 A1 | 10/2006 | Hawk et al. | |
| 2007/0143106 A1* | 6/2007 | Dunsmuir | H04M 3/53333 704/233 |
| 2007/0239831 A1 | 10/2007 | Basu | |
| 2008/0020735 A1* | 1/2008 | Bumiller | G06Q 10/00 455/412.1 |
| 2008/0056458 A1* | 3/2008 | Suito | G06Q 10/107 379/88.11 |
| 2008/0090609 A1* | 4/2008 | Walter | H04M 1/247 455/556.2 |
| 2008/0189648 A1* | 8/2008 | Anglin | G06F 17/30899 715/781 |
| 2008/0244442 A1 | 10/2008 | Veselova et al. | |
| 2009/0268017 A1* | 10/2009 | Ozawa | G06F 17/30817 348/61 |
| 2009/0307607 A1 | 12/2009 | Schauls et al. | |
| 2011/0072373 A1* | 3/2011 | Yuki | G06F 3/04817 715/764 |

FOREIGN PATENT DOCUMENTS

| | | |
|---|---|---|
| CN | 101647010 A | 2/2010 |
| EP | 0612006 A1 | 8/1994 |
| KR | 10-0619861 B1 | 9/2006 |
| KR | 10-2009-0122953 A | 12/2009 |

* cited by examiner

⇩ MOVE MEMO TO CLIPBOARD

LINK MEMO TO MAIL THROUGH
A PASTE FUNCTION

VIEW VIDEO/TV

WRITE AND STORE MEMO

STORE MEMO STORE TIME (PLAY TIME)

DISPLAY MEMO IN
A PREVIEW FORM ⬇

MEMO LIST    LINKED PAGE

WHEN MAIL IS OPENED

DISPLAY MEMO LINKED TO MAIL

WHEN MAIL IS OPENED

DISPLAY PLURALITY OF MEMOS LINKED TO MAIL
(TREE STRUCTURE)

WHEN MAIL IS OPENED
(TREE STRUCTURE)

DISPLAY PLURALITY OF MEMOS LINKED TO MAIL
(LIST FORM)

MOBILE TERMINAL AND MEMO MANAGEMENT METHOD THEREOF

Pursuant to 35 U.S.C. §119(a), this application claims the benefit of Korean Application No. 10-2010-0088590, filed on Sep. 9, 2010, the contents of which are incorporated by reference herein in their entirety.

BACKGROUND OF THE INVENTION

Field of the Invention

The present invention relates to a mobile terminal and corresponding memo management method for writing and managing a memo while using another application on the mobile terminal.

Description of the Related Art

A mobile terminal can perform various functions including a data and voice communication function, a function of capturing still or moving images through a camera, a voice storage function, a function of reproducing music files through a speaker system, a function of displaying images of videos, a function of playing games, etc. Thus, mobile terminals now function as a multimedia player. Moreover, recent mobile terminals can receive broadcast or multicast signals allowing the user to view videos or TV programs. Some mobile terminals also include a touch screen allowing the user to input information via the touch screen.

Thus, because the terminal provides a plurality of functions and programs, the user interface is also somewhat complicated to handle the variety of functions and programs. Further, the functions and programs are generally independent from each other, and each function or program includes its own menu options. This independent operation inconveniences the user.

SUMMARY OF THE INVENTION

Accordingly, an object of the present invention is to address the above-noted and other problems.

Another object of the present invention to allow a memo written on an application display screen being separately executed on the mobile terminal and managing the memo.

To achieve these and other advantages and in accordance with the purpose of the present invention, as embodied and broadly described herein, the present invention provides in one aspect a method of controlling a mobile terminal including executing, via a controller of the mobile terminal, an application; displaying, via a display unit of the mobile terminal, a display screen including information output by the executing application; displaying, via the display unit, a memo writing window on the display screen including the information output by the executing application; receiving, via the controller, a memo written in the memo writing window; linking, via the controller, the written memo to the information displayed in the display screen when the memo was written in the memo writing window; storing, via a memory of the mobile terminal, the linked memo and information; and re-displaying the memo linked with the information on the display screen if the application is re-executed.

In another aspect, the present invention provides a mobile terminal including a wireless communication unit configured to wirelessly communicate with at least one other terminal; a controller configured to execute an application; and a display unit configured to display a display screen including information output by the executing application, and to display a memo writing window on the display screen together with the information output by the executing application. The controller is further configured to receive a memo written in the memo writing window, to link the written memo to the information displayed in the display screen after the memo is written in the memo writing window, to store the linked memo and information in a memory of the mobile terminal, and to re-display the written memo linked with the information on the display screen when the application is re-executed.

Further scope of applicability of the present invention will become apparent from the detailed description given hereinafter. However, it should be understood that the detailed description and specific examples, while indicating preferred embodiments of the invention, are given by illustration only, because various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Hereinafter, a mobile terminal associated with the present invention will be described in more detail with reference to the accompanying drawings. A terminal can be implemented in various forms. A terminal disclosed herein may include mobile terminals such as a portable phone, a smart phone, a laptop computer, a digital broadcast terminal, a personal digital assistant (PDA), a portable multimedia player (PMP), a navigation system, and the like as well as stationary terminals such as a digital TV, a desktop computer, and the like. In the following description, it is assumed and described that the terminal is a mobile terminal. However, a configuration according to the following description may be applicable to the stationary terminal excluding constituent elements particularly configured for mobile purposes.

Figure 1:
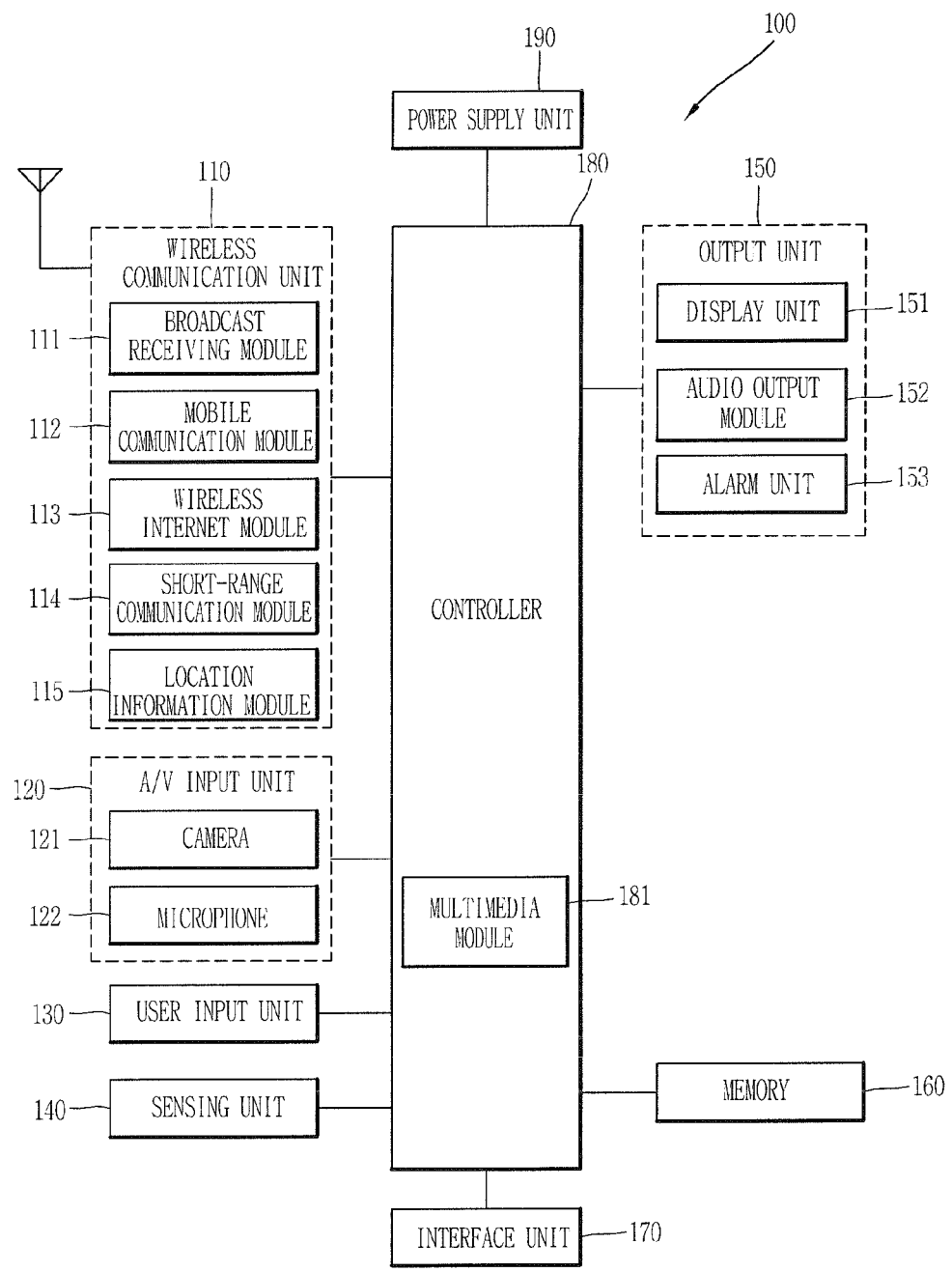
FIG. 1 is a block diagram illustrating a mobile terminal associated with an embodiment of the present invention.

Turning first to FIG. 1, which is a block diagram illustrating a mobile terminal 100 associated with an embodiment of the present invention. In the embodiment in FIG. 1, the mobile terminal 100 includes a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 also illustrates the mobile terminal 100 having various constituent elements. However, the constituent elements as illustrated in the drawing are not necessarily required, and the mobile terminal may be implemented with greater or fewer number of elements than those illustrated elements.

In addition, the wireless communication unit 110 includes one or more modules allowing radio communication between the mobile terminal 100 and a wireless communication system, or allowing radio communication between radio communication the mobile terminal 100 and a network in which the mobile terminal 100 is located. For example, in FIG. 1, the wireless communication unit 110 includes a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. Further, the broadcast management server corresponds to a server that generates and transmits a broadcast signal and/or broadcast associated information or a server that receives a previously generated broadcast signal and/or broadcast associated information and transmits to the mobile terminal 100. The broadcast associated information includes information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this instance, the broadcast associated information may be received by the mobile communication module 112. In addition, the broadcast associated information may exist in various forms such as in the form of an electronic program guide (EPG) of the digital multimedia broadcasting (DMB) system, an electronic service guide (ESG) of the digital video broadcast-handheld (DVB-H) system, and the like.

The broadcast receiving module 111 can also receive a broadcast signal using various types of broadcast systems. In particular, the broadcast receiving module 111 can receive a digital broadcast signal using a digital broadcast system such as the digital multimedia broadcasting-terrestrial (DMB-T) system, the digital multimedia broadcasting-satellite (DMB-S) system, the media forward link only (MediaFLO) system, the digital video broadcast-handheld (DVB-H) system, the integrated services digital broadcast-terrestrial (TSDB-T) system, and the like. The broadcast receiving module 111 can also be configured to be suitable for all broadcast systems that provide a broadcast signal as well as the above-mentioned digital broadcast systems.

In addition, the broadcast signal and/or broadcast-associated information received through the broadcast receiving module 111 may be stored in the memory 160. The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

Further, the wireless Internet module 113 includes a module for supporting wireless Internet access. The wireless Internet module 113 may be built-in or externally installed to the mobile terminal 100, and can use a wireless Internet access technique including a WLAN (Wireless LAN), Wi-Fi, Wibro (Wireless Broadband), Wimax (World Interoperability for Microwave Access), HSDPA (High Speed Downlink Packet Access), and the like. The short-range communication module 114 is a module for supporting a short-range communication, and can use a short-range communication technology including Bluetooth, Radio Frequency IDentification (RFID), Infrared Data Association (IrDA), Ultra WideBand (UWB), ZigBee, and the like.

In addition, the location information module 115 is a module for checking or acquiring a location of the mobile terminal 100, and corresponds to a Global Positioning System (GPS) module as a representative example. The GPS module calculates spaced-apart distance information and accurate time information from three or more satellites and then applies trigonometry to the calculated information, thereby accurately calculating current position information based on latitude, longitude, and height. The GPS module can use a method of calculating position and time information using three satellites and correcting an error of the calculated position and time information using another satellite. Furthermore, the GPS module can calculate speed information by continuously calculating a current position in real time.

In addition, the A/V (audio/video) input unit 120 receives an audio or video signal and includes a camera 121 and a microphone 122. The camera 121 processes an image frame, such as a still picture or video, obtained by an image sensor in a video phone call or image capturing mode. The processed image frame may be displayed on a display unit 151. The image frames processed by the camera 121 may also be stored in the memory 160 or transmitted to the outside through the wireless communication unit 110. Two or more cameras 121 may also be provided according to the use environment of the mobile terminal.

The microphone 122 receives an external audio signal through a microphone in a phone call mode, a recording mode, a voice recognition mode, and the like, and processes the audio signal into electrical voice data. The processed voice data is then converted and output into a format that is transmittable to a mobile communication base station through the mobile communication module 112 in the phone call mode. The microphone 122 may also implement various types of noise canceling algorithms to cancel noise generated in a procedure of receiving the external audio signal.

Further, the user input unit 130 can be used to generate input data to control an operation of the terminal. The user input unit 130 may include a keypad, a dome switch, a touch pad (pressure/capacitance), a jog wheel, a jog switch, and the like. Particularly, when the touch pad forms an interlayer structure together with the display unit 151, the interlayer structure is referred to as a touch screen.

In addition, the sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, the sensing unit 140 can sense an opened or closed state of the slide phone. The sensing unit 140 also takes charge of a sensing function associated with whether or not power is supplied from the power supply unit 190, or whether or not an external device is coupled to the interface unit 170. The sensing unit 140 can also include a proximity sensor.

Furthermore, the sensing unit 140 may include a magnetic field sensor for calculating the direction of movement when the user moves, a gyro sensor for calculating the direction of rotation, and an acceleration sensor for multiplying the user's stride by the number of strides to calculate the distance of movement.

In addition, the interface unit 170 performs a role of interfacing with external devices connected to the mobile terminal 100. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. In addition, the identification module may be configured as a chip for storing various information used to authenticate an authority for using the mobile terminal 100, which may include a User Identity Module (UIM), a Subscriber Identity Module (SIM) and the like. Also, the device provided with the identification module (hereinafter, referred to as 'identification device') may be implemented in the type of a smart card. Hence, the identification device can be coupled to the mobile terminal 100 via a port.

The interface unit 170 can also receive data or power from an external device and transfer the received data or power to each constituent element in the mobile terminal 100, or transmit data within the mobile terminal 100 to the external device. Also, the interface unit 170 may serve as a path for power to be supplied from an external cradle to the mobile terminal 100 when the portable terminal 100 is connected to the external cradle, or as a path for transferring various command signals input from the cradle by the user to the mobile terminal 100. Such various command signals or power input from the cradle may be operated as signals for recognizing that the mobile terminal 100 has accurately been mounted on the cradle.

In addition, the output unit 150 is configured to provide an output for audio signal, video signal, or alarm signal, and in FIG. 1, includes the display unit 151, an audio output module 152, an alarm unit 153, a haptic module 154, and the like. In more detail, the display unit 151 can display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

Also, when the display unit 151 and the touch pad form an interlayer structure to constitute a touch screen, the display unit 151 may be used as an input device in addition to an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display. Some of those displays may be configured with a transparent type to allow viewing of the exterior through the display unit, which may be called transparent displays. An example of the typical transparent displays may include a transparent LCD (TOLED), and the like.

The display unit 151 may also be implemented in two or more in number according to a configured aspect of the mobile terminal 100. For example, an external display unit and an internal display unit may be simultaneously provided on the mobile terminal 100. The touch screen may be configured to detect a touch input pressure as well as a touch input position and area.

In addition, the audio output module 152 can output audio data received from the wireless communication unit 110 or stored in the memory 160, in a call-receiving mode, a call-placing mode, a recording mode, a voice recognition mode, a broadcast reception mode, and so on. The audio output module 152 can also output audio signals relating to functions performed in the portable terminal 100, e.g., sound alarming a call received or a message received, and so on. The audio output module 152 may include a receiver, a speaker, a buzzer, and so on.

Further, the alarm 153 outputs signals notifying occurrence of events from the portable terminal 100. The events occurring from the mobile terminal may include a call received, message received, key signal input, touch input, and so on. The alarm 153 may output not only video or audio signals, but also other types of signals such as signals notifying occurrence of events in a vibration manner. When a call signal or message is received, the alarm 153 may also output a vibration to notify this. Otherwise, when a key signal is input, the alarm 153 may output a vibration as a feedback to the input key signal. Through the foregoing vibration output, the user can recognize an event occurrence. The signal for notifying an event occurrence may be also output through the display unit 151 or the audio output module 152.

In addition, the memory 160 can store a program for processing and controlling of the controller 180, and/or temporarily store input/output data (e.g., phonebook data, messages, still images, video and the like). Also, the memory 160 can store data related to various patterns of vibrations and audio output upon a touch input on the touch screen. Further, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may manage a web storage which performs a storage function of the memory 160 on the Internet.

In addition, the controller 180 controls an overall operation of the portable terminal 100. For example, the controller 180 performs the control and processing associated with telephone calls, data communications, video calls, and the like. Furthermore, in FIG. 1, the controller 180 includes a multimedia module 181 for reproducing multimedia files. The multimedia module 181 may be implemented in the controller 180, or may be implemented separately from the controller 180. The controller 180 can also perform a pattern recognition processing so as to recognize handwriting or drawing input performed on the touch screen as a text or image.

Further, the power supply unit 190 provides power used by various components under the control of the controller 180. The provided power may be internal power, or external power thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The mobile terminal 100 as illustrated in FIG. 1 may be configured to be operated in a communication system capable of transmitting data via frames or packets including a wireless or wired communication system and a satellite-based communication system. For example, FIG. 2 illustrates a communication system in which the mobile terminal 100 is operable.

A communication system may use different wireless interfaces and/or physical layers. For example, a wireless technique that can be used by a communication system may include Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), and the like. Hereinafter, for the sake of convenience of explanation, the description will refer to CDMA. However, the present invention may be applicable to all kinds of communication systems including the CDMA wireless communication system.

Figure 2:
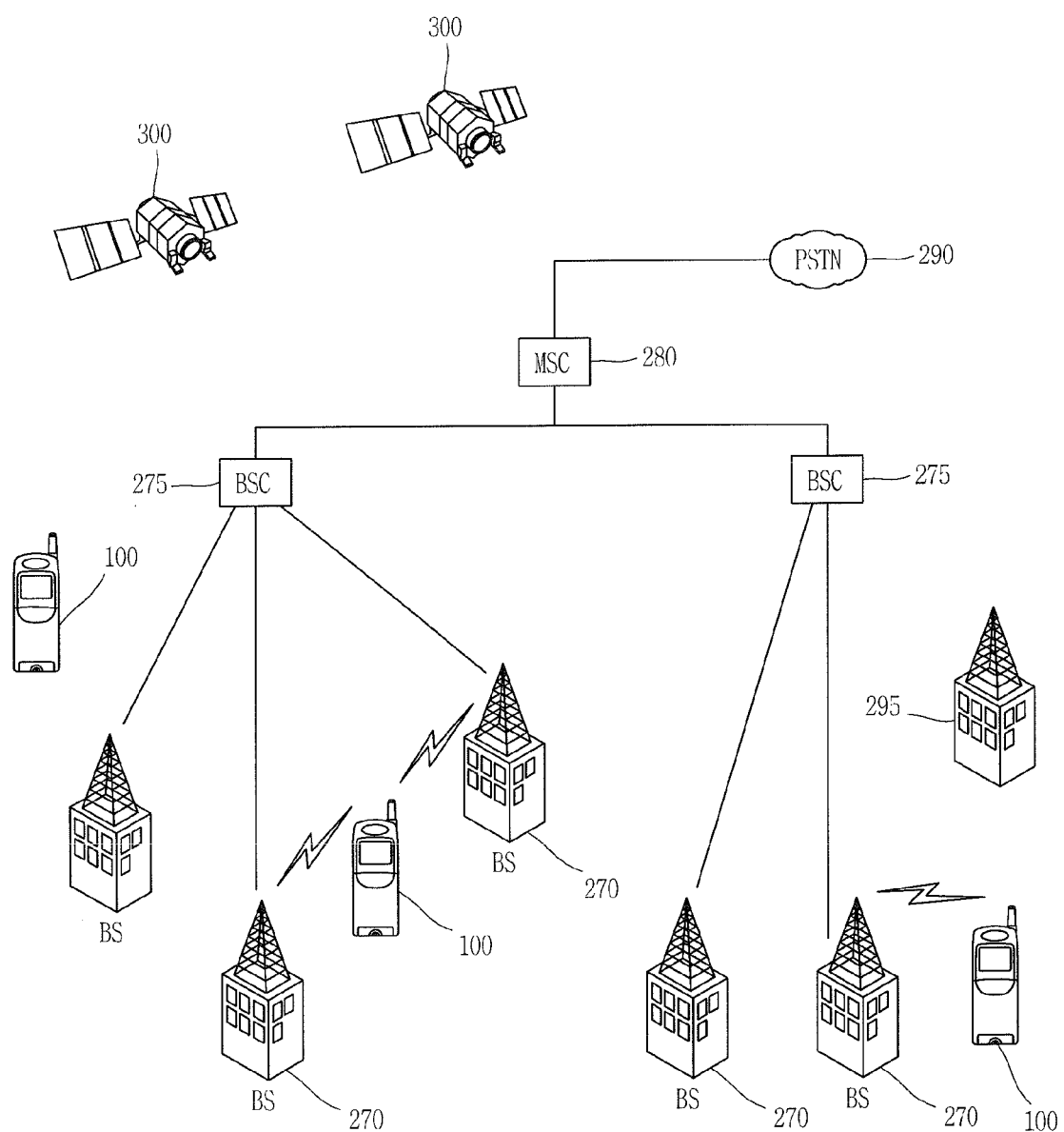
FIG. 2 is a block diagram illustrating a wireless communication system in which a mobile terminal associated with an embodiment of the present invention can be operated.

As illustrated in FIG. 2, the CDMA communication system includes a plurality of terminals 100, a plurality of base stations (BSs) 270, a plurality of base station controllers (BSCs) 275, and a mobile switching center (MSC) 280. The MSC 280 is configured to be connected to a public switched telephone network (PSTN) 290, and also configured to be connected to BSCs 275. The BSCs 275 may be connected to BSs 270 in pairs through a backhaul line. The backhaul line may be provided with at least one of E1/T1, ATM, IP, PPP, Frame Relay, HDSL, ADSL, and xDSL. Accordingly, a plurality of BSCs 275 may be included in a system as illustrated in FIG. 2.

Each BS 270 may include at least one sector, and each sector may include an omni-directional antenna or an antenna directing a specific radial direction from the BS 270. Alternatively, each sector may include two or more antennas in various shapes. Each BS 270 may also be configured to support allocation of a plurality of frequencies in which each frequency allocation has a specific spectrum (for example, 1.25 MHz, 5 MHz, etc.).

An intersection between the sector and the frequency allocation may be referred to as a CDMA channel. The BSs 270 may also be referred to as Base Station Transceiver Subsystems (BTSs). In this instance, the term "base station" may refer to a combination of one BSC 275 and at least one BS 270. The base station may also designate a "cell site". Alternately, each of the sectors with respect to a specific BS 270 may be referred to as a plurality of cell sites.

As illustrated in FIG. 2, a Broadcasting Transmitter (BT) 295 serves to transmit a broadcast signal to the terminals 100 operating in the system. The broadcast receiving module 111 illustrated in FIG. 1 is provided in the terminal 100 so as to receive the broadcast signal transmitted by the BT 295.

Moreover, FIG. 2 illustrates several Global Positioning System (GPS) satellites 300. The satellites 300 serve to detect the position of at least one of the multiple terminals 100. Two satellites are illustrated in FIG. 2; however, useful position information may be obtained by more or fewer than two satellites. The GPS module 115 illustrated in FIG. 1 cooperates with the satellites 300 so as to obtain desiring position information. Here, the module 115 can track the position using all techniques allowed to track positions, as well as the GPS tracking technology. Also, at least one of the GPS satellites 300 may handle satellite DMB transmission alternatively or additionally.

Among typical operations of a wireless communication system, the BS 270 serves to receive reverse link signals from various terminals 100. At this time, the terminal 100 is connecting a call, transmitting and/or receiving a message or executing other communication operations. Each reverse link signal received by a specific base station 270 is processed within the specific BS 270. Data generated resulting from the processing is transmitted to the connected BSC 275. The BSC 275 serves to allocate a call resource and manage mobility, including systemization of soft handoffs between the BSs 270. Also, the BSC 275 transmits the received data to the MSC 280, and then the MSC 280 provides an additional transmission service so as to be connected to a PSTN 290. Similarly, the PSTN 290 is connected to the MSC 280 and the MSC 280 is connected to the BSCs 275, and the BSCs 275 controls the BSs 270 so as to transmit forward link signals to the terminals 100.

According to an embodiment of the present invention, a mobile terminal and memo management method thereof capable of simply writing a memo on the display screen and managing the memo are provided. The display screen may include all still or moving images provided by a specific web site, TV broadcast, or the like as well as the function of the mobile terminal provided by the user such as mail (Outlook Express), web browsing (Internet Explorer), video play, and text screens.

Further, the written memo is linked to the relevant display screen to be stored. The display screen linked with the memo is preferably stored in a file form. In particular, when the display screen includes pages of text, the written memo may be linked to at least one page. Accordingly, when the user reselects and opens the display screen stored in a file form, a memo that has been written together with the relevant screen is displayed at one side, for example, and the memo is included and transmitted even when transmitting the stored display screen to another user.

Hereinafter, various embodiments of the present invention will be described.

Memo Writing

According to one embodiment of the invention, memo writing is made through a memo writing window. In particular, the user can select a "memo" menu included in the user menu to display a memo writing window while checking or viewing an e-mail (e.g., Outlook Express), web browser (e.g., Internet Explorer), video, or text. The user can then write a simple memo for the mail, specific web site content, TV and video on the memo writing window. The written memo is then automatically linked to the relevant screen. Further, the written memo can be linked to at least one or more pages, which will be described in more detail later.

Figure 3A:
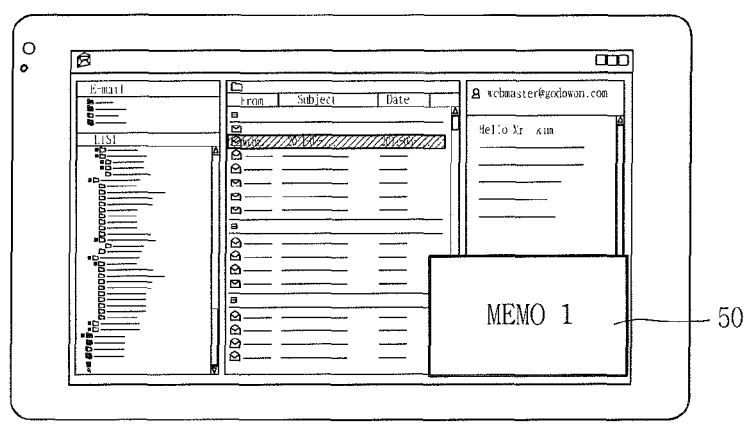
FIGS. 3A through 3C are overviews of display screens illustrating the display location of a memo writing window.
Figure 3B:
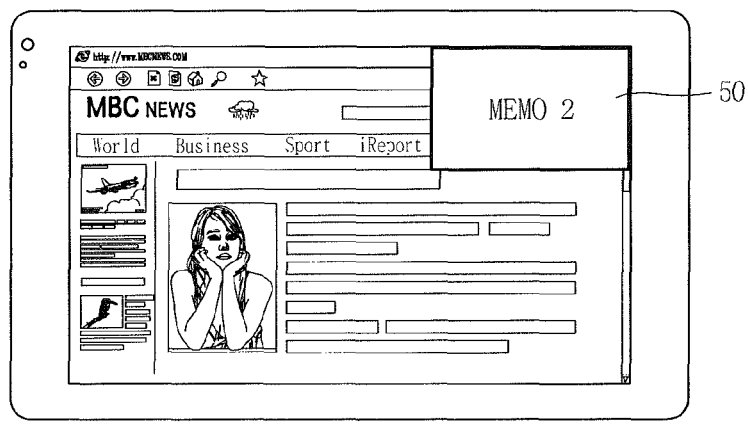
Figure 3C:
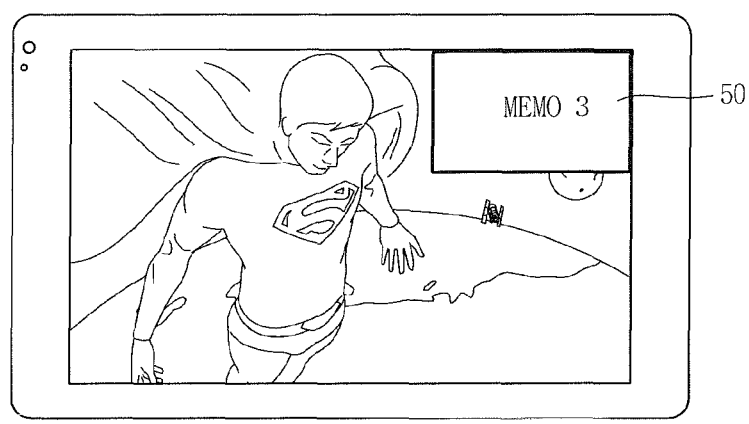

Next, FIGS. 3A through 3C are overviews of display screens illustrating the display location of a memo writing window. In particular, FIG. 3A-3C illustrates a memo writing window 50 being displayed in a region where the mail, web site or video screen (moving image or TV screen) is covered the least. The user can also change the size and location of the memo writing window 50 using a touch and drag operation, for example.

Figure 4:
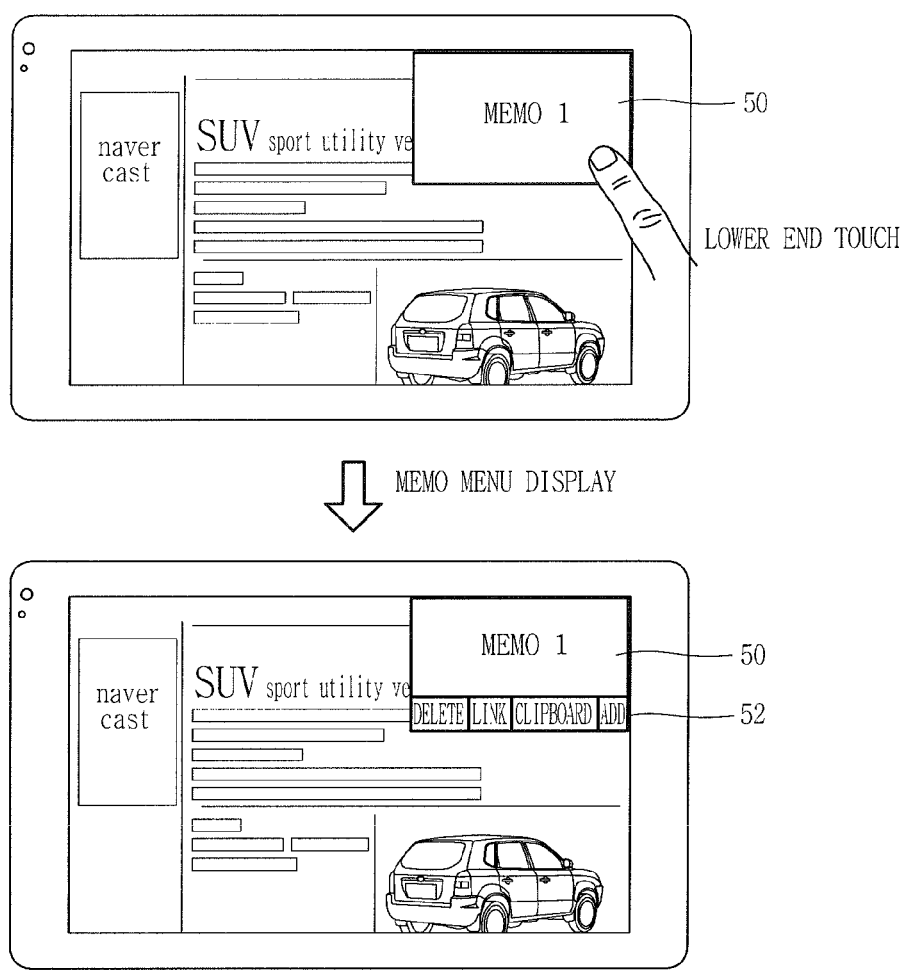
FIG. 4 is a view illustrating an example of displaying a memo menu.

Next, FIG. 4 is an overview of a display screen illustrating an example of displaying a memo menu 52. As shown, the user can view the memo menu 52 by touching a predetermined location of the lower end or corner of the memo writing window 50. As shown, the memo menu 52 includes, for example, delete, link, clipboard, and add items.

In more detail, the delete item is used to delete a memo, the link item is used to indicate link information linked to the relevant memo, the clipboard item is used to move a written memo to the clipboard to perform a paste operation, and the add (or link add) item is used to add a link to the written memo. Accordingly, for example, if the user selects the link item, a memo is displayed on the upper end thereof and a current captured screen is displayed on the lower end of the menu to link the memo with the current captured screen.

Written Memo Link

According to an embodiment of the present invention, the completion time of memo writing corresponds to a timing at which the user's additional operation occurs subsequent to memo writing. For example, the controller 180 can detect the timing of a touch operation (long touch) as a memo writing complete timing, thereby allowing the user to select a memo writing complete button, perform a touch operation (short touch) for displaying the memo menu, or display a link select menu for linking a memo to a plurality of pages.

When the controller 180 detects the memo writing has completed, the controller 180 automatically links the written memo to a currently displayed screen. The automatic link feature is also preferably applied to linking a memo to one screen.

Figure 5:
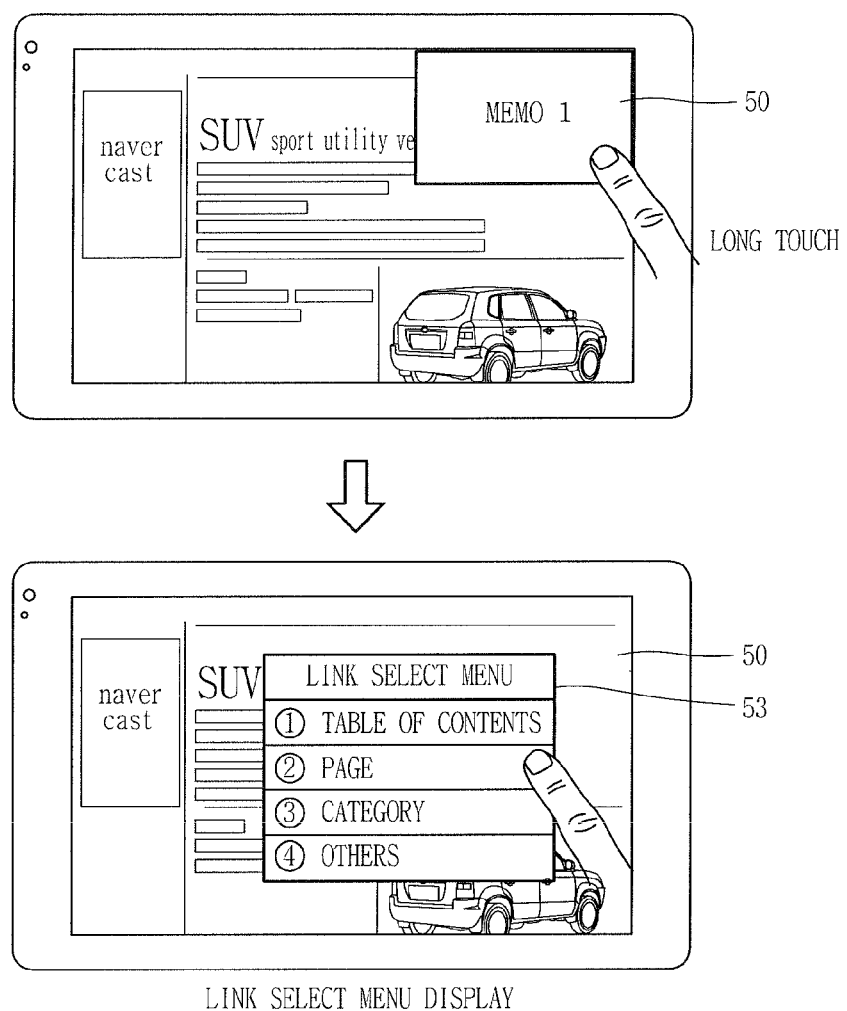
FIG. 5 is a view illustrating an example of linking a written memo to a plurality of pages or e-mails.

Turning next to FIG. 5 which is an overview of a display screen illustrating an example of linking a written memo to a plurality of pages or e-mails. As illustrated in FIG. 5, when the written memo is going to be linked to a plurality of screens, for example, a plurality of pages or different screens, the controller 180 displays an additional link select menu 53. As shown in FIG. 5, the controller 180 can display the link select menu 53 when the user long-touches the memo writing window 50.

Furthermore, the controller 180 can display the link select menu 53 when the user moves a page or displays another screen when the memo writing window 50 is displayed thereon. In other words, when the user displays a current page by moving it to another page or switching it to another screen when the memo writing window 50 is displayed thereon, the controller 180 can display a message "Would you like to link the memo to another page (or screen)?" and then display the link select menu 53 if the user selects "Yes."

As shown in FIG. 5, the link select menu 53 can include a table of contents or specific page when the currently displayed content is text, and include a category when it is an e-mail. The user can then select at least one or more pages or categories, and link the written memo to the designated pages or categories.

Written Memo Modification and Link Change

According to an embodiment of the present invention, the content of a written memo may be modified. For example, the change of the memo content may be divided into two types. One type is one memo linked to one screen or text and the other type is one memo linked to a plurality of pages.

In more detail, when one memo is linked to one screen or text, the memo may be directly modified in the actual memo displayed together with the linked content when the relevant screen is displayed. However, when the memo to be modified is linked to a plurality of pages, the controller 180 checks whether the modified content is also reflected on another page. Accordingly, when the user modifies and stores a memo, the controller 180 displays a message indicating whether the modified content is reflected on another page. The user can then selectively modify the memo for all pages or only some pages linked according to the displayed message.

Furthermore, according to an embodiment of the present invention, the link information of a memo as well as the memo content can be modified. Changing the link information of the memo can be performed using the memo menu 52 illustrated in FIG. 4.

Figure 6A:
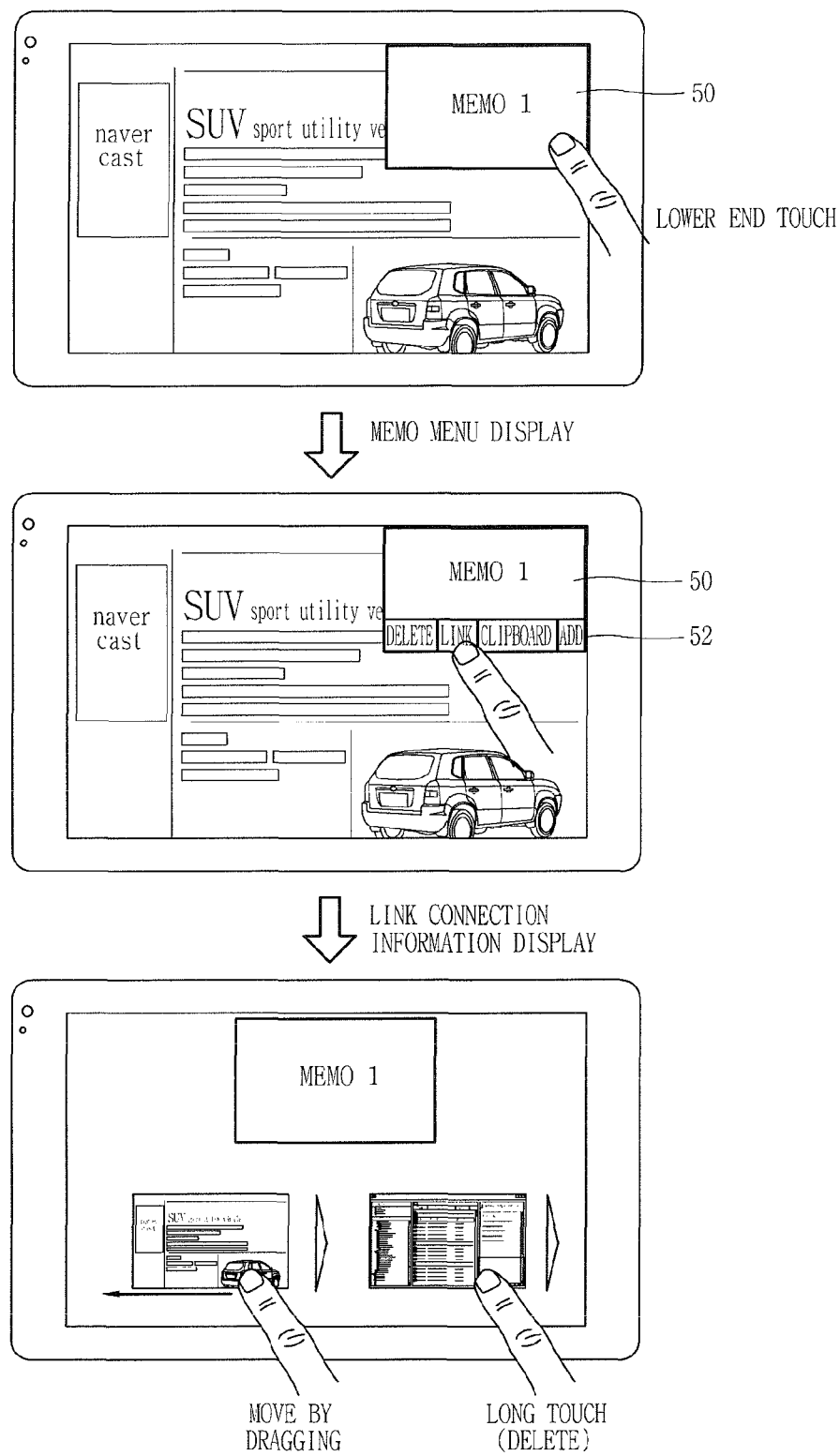
FIGS. 6A through 6D are views illustrating various embodiments for changing link information.

In particular, FIGS. 6A-6D are overviews of display screens illustrating various embodiments for changing link information. For example, FIG. 6A illustrates changing a link using the link item in the memo menu 52. As illustrated in FIG. 6A, if the user touches a predetermined location of the lower end of the memo writing window 50, the controller 180 displays the memo menu 52 including delete, link, clipboard, and add items on the lower end of the memo window 50.

When the user selects the link item in the memo menu 52, the controller 180 switches the screen to display the memo content and link information corresponding to pages, etc. that can be linked to the memo content. At this time, the memo menu 52 is preferably not displayed. Further, the link information may include at least one or more pages or e-mails linked to one memo. The user can also search for the linked pages or e-mails using a touch and drag operation, and delete a specific link by long-touching the specific link information (page or e-mail) during the search process.

Furthermore, when the user wants to add a link, the user can display the link select menu by long-touching the currently displayed memo content and then select another page or e-mail from the relevant link select menu to add a link. The added link information is displayed on the lower end of the memo content.

Figure 6B:
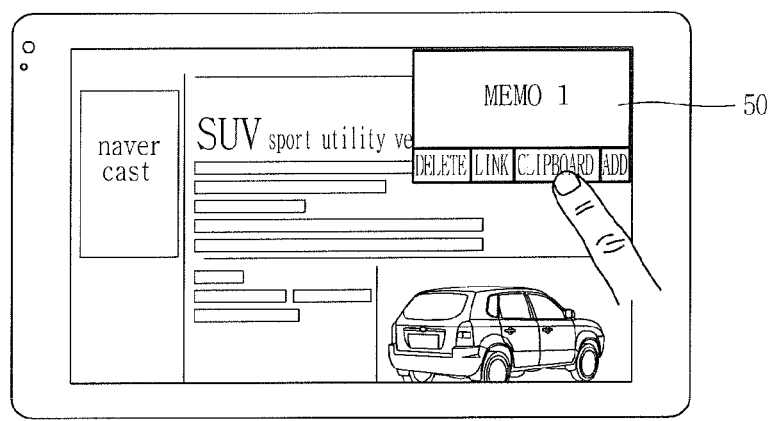
Figure 6B:
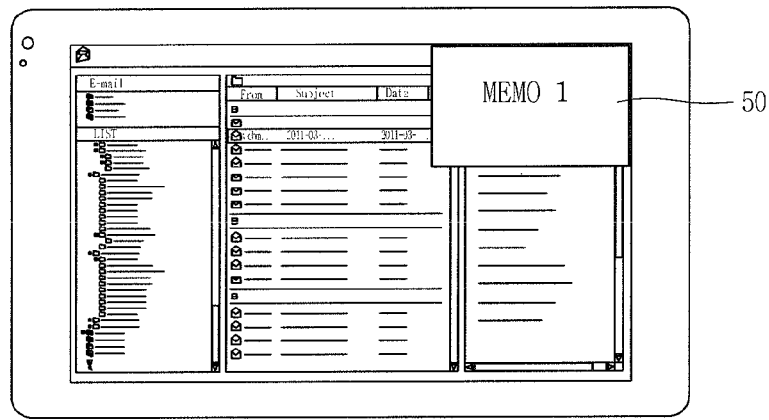

Next, FIG. 6B is an overview of a display screen illustrating an example of link change through a clipboard item in the memo menu 52. When the user selects a clipboard item in the memo menu 52 when a memo 1 is linked to a specific page of the web site (for example, Naver), the controller 180 moves the relevant memo 1 to the clipboard. Then, if the user pastes the relevant memo 1 to an e-mail using a paste function, the controller 180 automatically links the memo 1 to the e-mail.

Figure 6C:
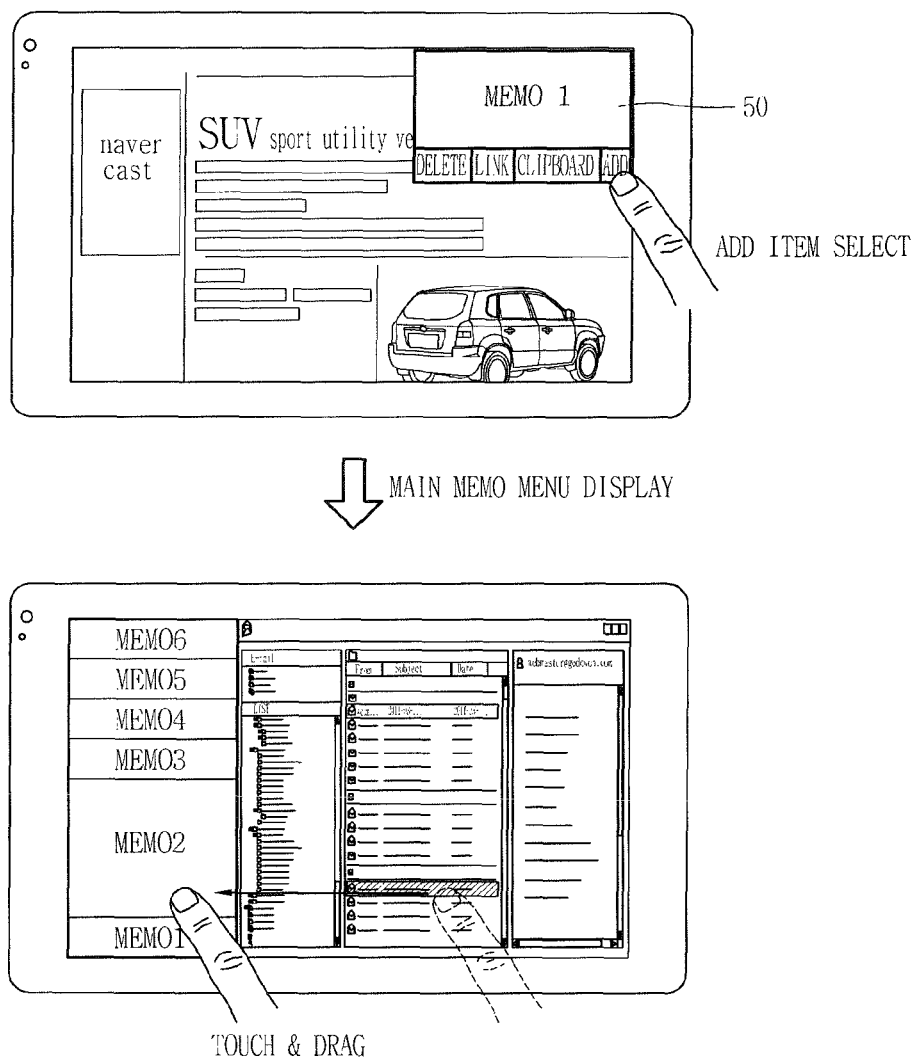

FIG. 6C is an overview of a display screen illustrating an example of link change through a link add item in the memo menu 52. As illustrated in FIG. 6C, when the user selects an add item in the memo menu 52 while the memo 1 is linked to a specific page of the web site (for example, Naver), the controller 180 displays a "main memo menu" on the screen. In particular, as shown in FIG. 6C, the main memo menu includes a memo list displayed on the left side thereof, and each memo and the linked e-mail or page are displayed on the right side thereof.

The user can search for an e-mail or page to be linked with the memo 1 by toggling the displayed memo list (toggle search), and the corresponding e-mail or page is displayed on the right side thereof. The user can also reselect the "add item" or touch the relevant e-mail when an e-mail linked to a memo 2 is displayed on the right side thereof during the toggle search or drag to the memo 1 when touching the relevant e-mail to link the memo 1 to the e-mail. As a result, the memo 1 and memo 2 are simultaneously linked to the e-mail.

Figure 6D:
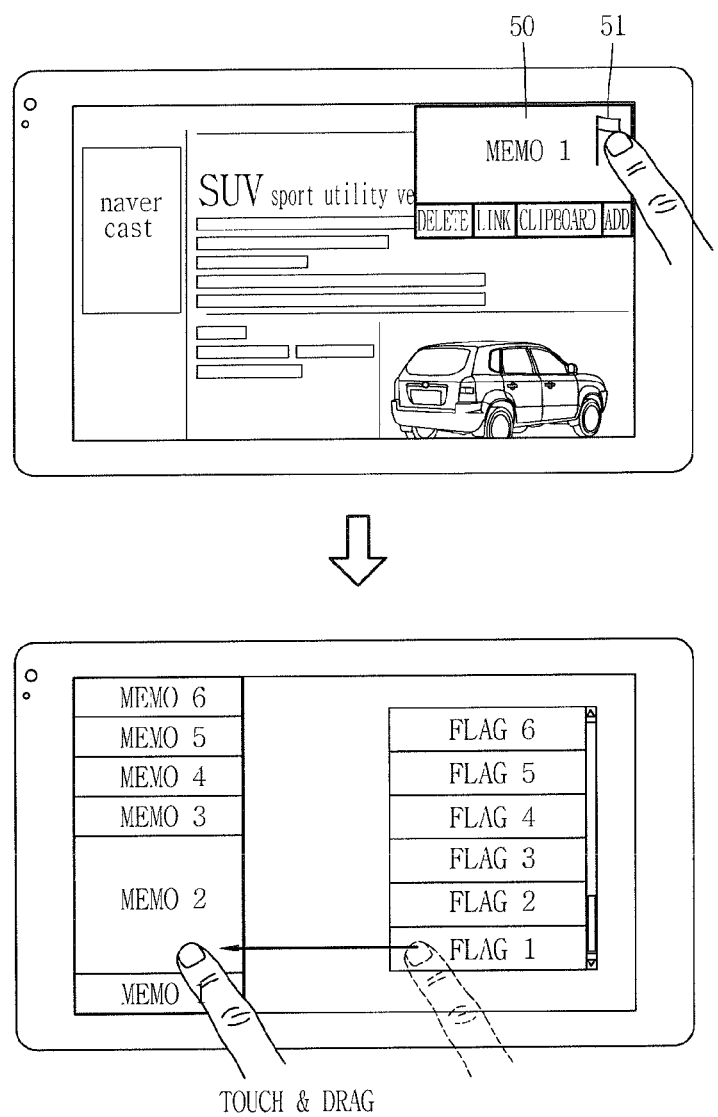

Next, FIG. 6D is an overview of a display screen illustrating an example of a link change through a flag in a flag region 51. In particular, when the user touches the flag region 51 in the memo menu 52 as illustrated in FIG. 6D, a flag is added to the relevant memo 1. The use of such a flag is provided to enhance the convenience of search, and may be applicable to a situation in which selective memo management is required. Accordingly, a memo list may be displayed on the left side and a flag may be displayed on the right side thereof instead of displaying an e-mail or page on the right side thereof. The list of flags may also be movable by a scroll bar.

Therefore, the user can link the memo 1 to an e-mail by touching and dragging the flag 1 displayed on the right to the memo 2 displayed on the left. As a result, the mail is linked with memo 1 and memo 2 at the same time. Further, even though the memo 1 is initially linked to pages 1, 2 and 3 through the foregoing link change, for example, the memo 1 can be changed to be linked to only pages 1 and 2. Further, the linking of memo 1 to only page 1 can be changed to be linked to pages 4, 5 and 6.

Written Memo Store

Figure 7:
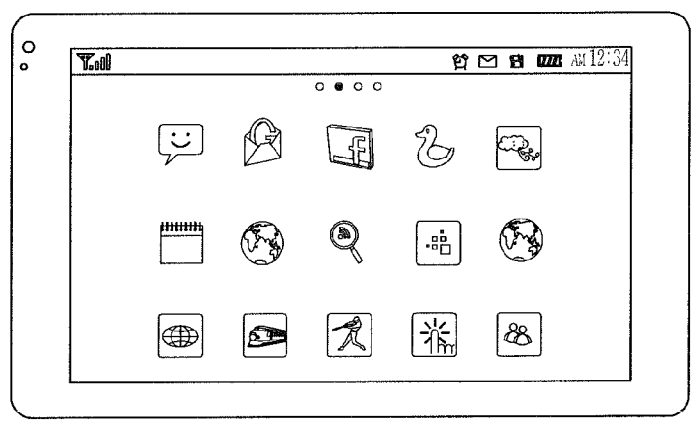
FIG. 7 is an overview illustrating an example of the memo box according to an embodiment of the present invention.

A written memo can also be stored in the memo box. For example, FIG. 7 is an overview of a display screen illustrating a stored memo box according to an embodiment of the present invention. As illustrated in FIG. 7, a memo written in the memo writing window 50 is stored when the user selects a store menu option. The stored memo is also stored and linked for each application (e.g., for each message or each web page) or for each page. For example, a memo associated with a message can be stored in the first row, a memo associated with text can be stored in the second row, and a memo associated with a video can be stored in the third row.

The written memo may also be stored in a file+memo form or stored in a screen capture+memo form. In other words, a memo written on a message or page screen may be stored together with the page or the content of a specific page, and a memo written on web page, image and moving image screens may be stored together with the captured screen. In addition, a URL may be stored together with the memo content when storing a memo on the web page, and a memo written on the received letter may be mainly stored with text.

Further, as shown in FIG. 7, the written memo may be stored in a thumbnail or icon form. For example, the thumbnail may have a form in which the display screen is captured, and the icon may be displayed with a different shape, size, color or the like capable of representing the best of the relevant screen. Also, metadata (e.g., an index tag) may be included in a memo to be stored. The metadata can be used to facilitate a sorting process.

In more detail, the metadata may express the content of memo (subject or text), link information, play time (for video), information on a memo writer, creation date, used condition, and the like. A memo received from another person can also be separately stored.

Figure 8:
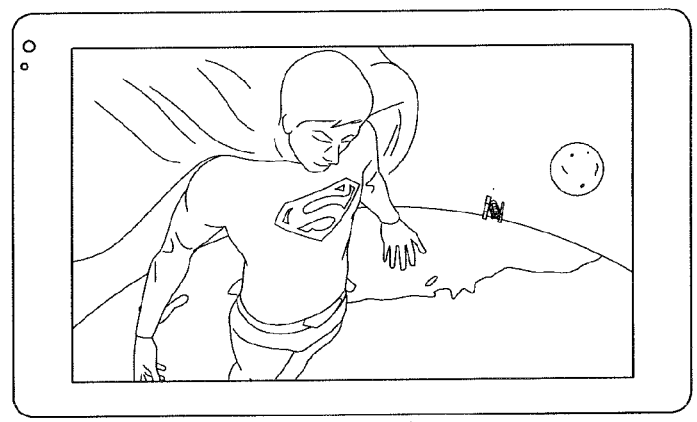
FIG. 8 is an overview illustrating an example of writing and storing a memo while viewing video/TV.
Figure 8:
Figure 8:
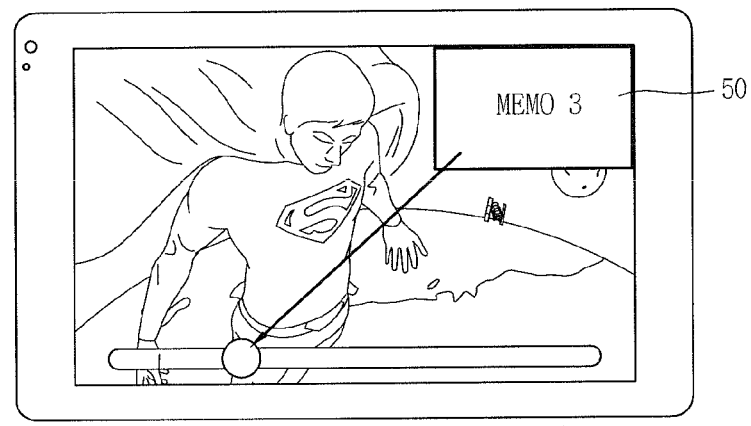

Next, FIG. 8 is an overview illustrating an example of writing and storing a memo while viewing video/TV. As illustrated in FIG. 8, when the user writes a memo while viewing video/TV, and stores the relevant memo at a specific time, the controller 180 stores a memo store time together with a play time of video/TV. Thus, the user can see when the memo was created with respect to the play time of the video/TV.

Memo Alignment

According to an embodiment of the present invention, a display type of a memo displayed in the memo box is aligned. In more detail, user written memos can be aligned in a form that the user can easily distinguish the relevant memos.

That is, the memos displayed in the memo box can be aligned in a form similar to various icons alignments displayed on an initial screen of the mobile terminal. In other words, the user can view stored memos in an aligned manner by selecting an additional alignment menu. The memos may be aligned for each index, time sequence, application and category. Each memo can also be aligned in a folder form, or aligned in a thumbnail or icon form in the stored memo box. For example, the memos may be aligned by automatically indexing repeated words in the memo.

In addition, the text color and background color of the aligned memo may be differently displayed for each category, and may be linked to a scheduling function. If the memo is linked to a scheduling function, then a memo included in past schedules and urgent messages in the memo box can be identified as urgent by changing a background color. An old memo may also be highlighted to prompt the user to delete the old memo.

Further, if the memo is linked to a schedule or alarm function, the controller 180 can load and display the memo on the display unit 151 on the relevant date. Thus, the memo can be used to perform a schedule management and notification function for the user.

Figure 9:
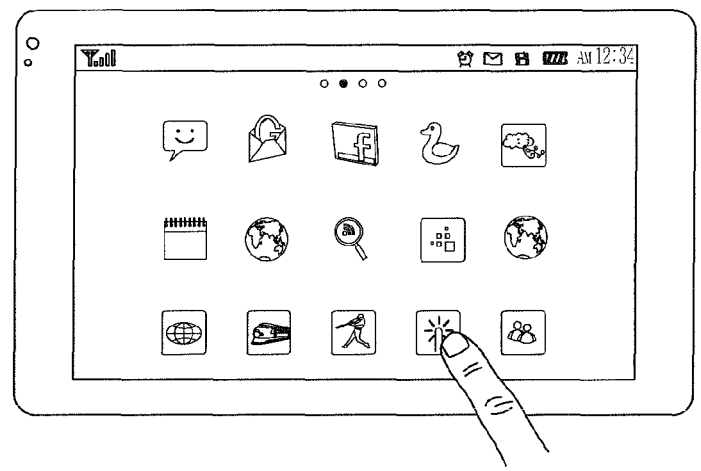
FIG. 9 is an overview illustrating an example in which a memo list and the memo content are shown in a preview form when a memo is selected from the memo box.
Figure 9:
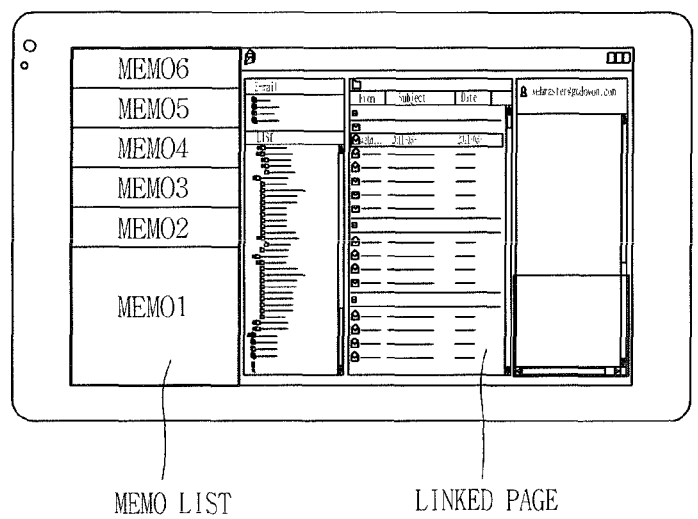

Next, FIG. 9 is an overview of a display screen illustrating a memo list and memo content in a preview form when a memo is selected from the memo box. In particular, a the user can touch a desired memo displayed in the memo box, and the controller 180 displays the linked memo content on the right side together the selected memo. Thus, as shown in FIG. 9, the memos and linked contents are first displayed as icon or thumbnails, and when the user selects one of the icons or thumbnails, the memo contents are displayed in a preview form so the user can get a preview of the memo and contents.

Stored Memo Display

Figure 10A:
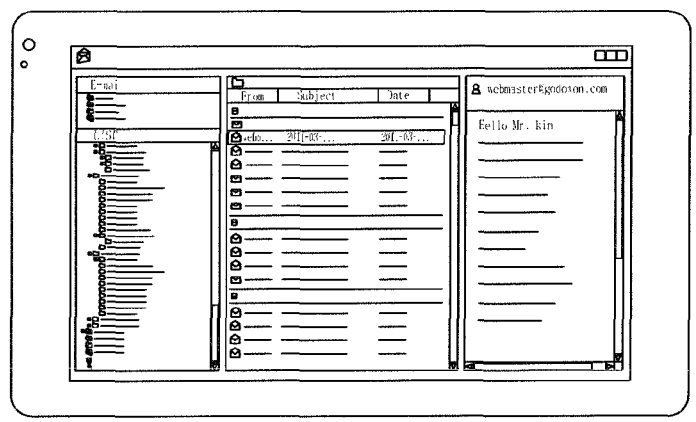
FIGS. 10A through 10E are overviews illustrating a display form of the memo stored in the memo box.
Figure 10A:
Figure 10A:
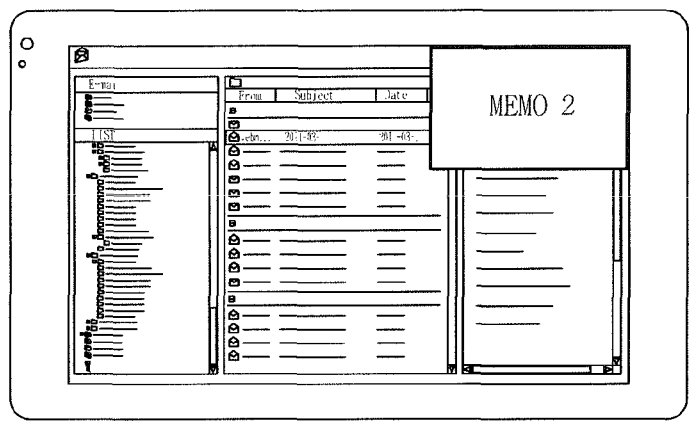

FIGS. 10A-10E are overviews of display screens illustrating a display form of the memo stored in the memo box. That is, when a particular application is opened such as an e-mail, text, video/TV, the controller 180 automatically displays linked memo contents. FIG. 10A illustrates memo contents linked with an e-mail being automatically displayed when the e-mail is opened. As shown, the memo may be displayed on the upper right side of the mail screen. The user can also move the display location of the memo contents via a touch and drag operation, for example.

Figure 10B:
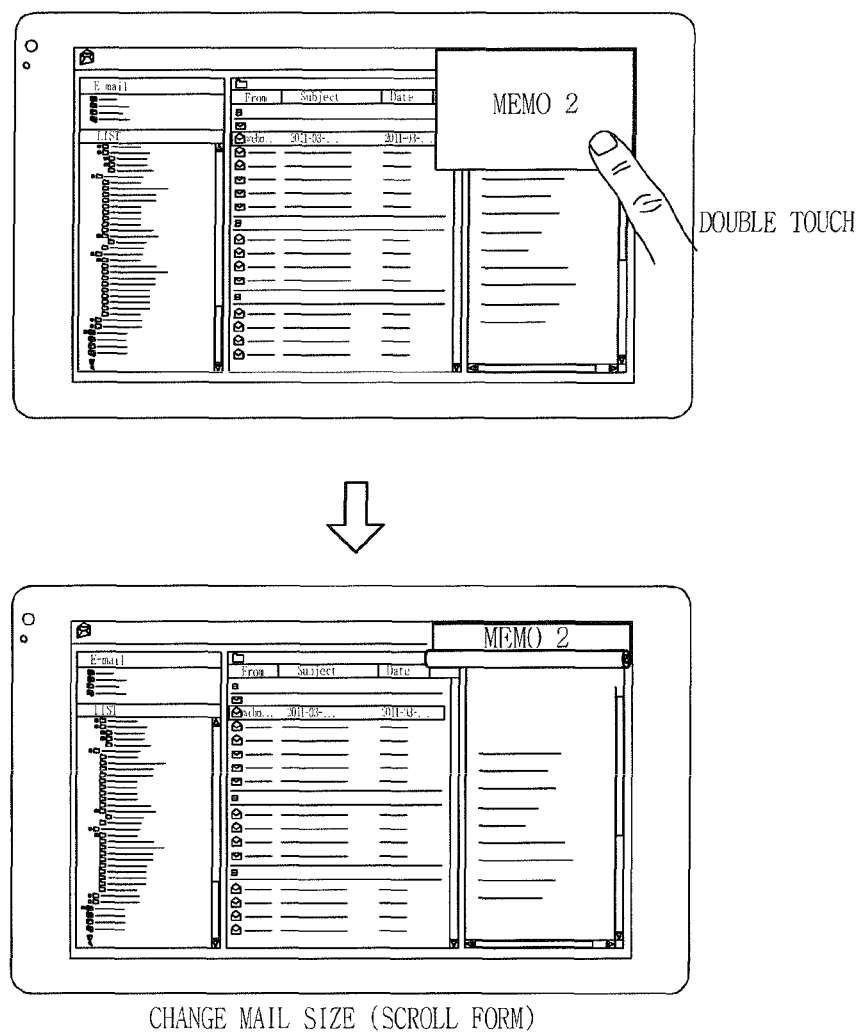

FIG. 10B illustrates the user performing a double touch operation to reduce the size of the memo contents. In the example in FIG. 10B, the memo contents are rolled up like a window shade. The user can then unroll the displayed memo contents by performing another double touch operation, for example.

Further, the controller 180 can change the displayed memo into a semi-transparent state when a predetermined time has passed, and automatically remove the display of the memo when more time has passed. The user can redisplay the removed memo by touching an initially memo displayed region or through voice recognition. For example, the user can touch a vacant portion of a web page to have the contents linked to the web page be redisplayed. The user can also select a memo hot key to have the memo redisplayed. The controller 180 can also change or switch the transparency or semi-transparency of the memo when the user touches a particular memo or shakes the terminal regardless of time.

Figure 10C:
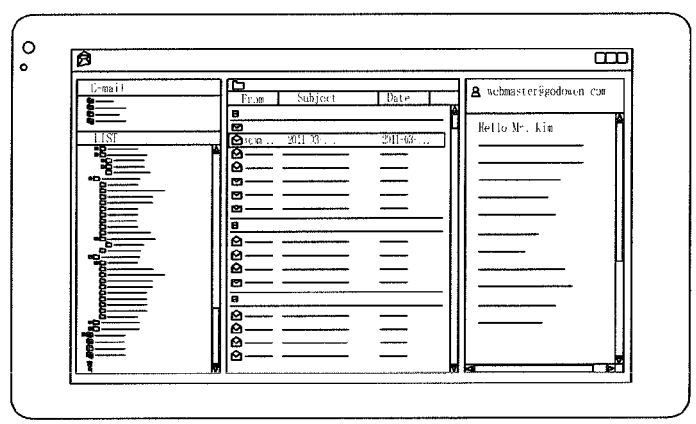
Figure 10C:
Figure 10C:
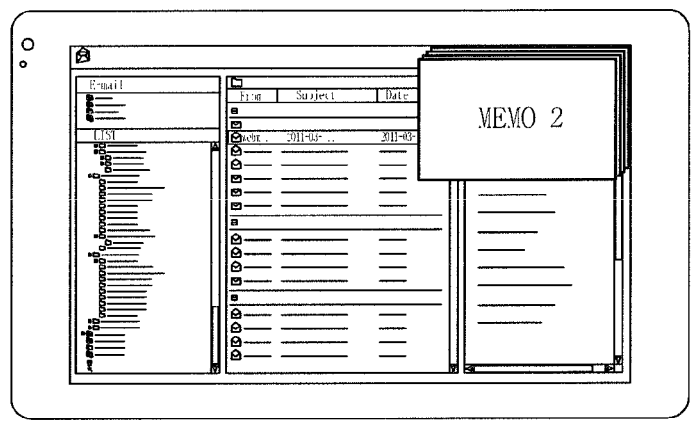

As described above, multiple memos may be linked to one screen. Thus, as shown in FIG. 10C, when multiple memos are linked to one screen, the controller 180 can display the multiple memos in a tree structure. The user can then toggle through the multiple memos using a particular touch pattern (e.g., single touch, double touch, etc.) so that a next memo is displayed (e.g., in the sequence of memo 2-memo 1-memo 3).

Figure 10D:
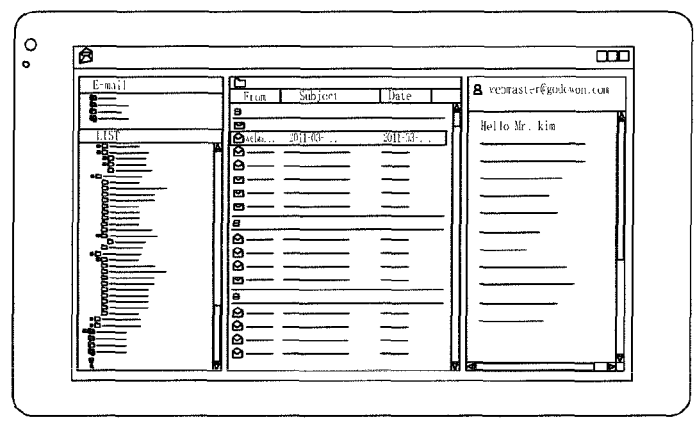
Figure 10D:
Figure 10D:
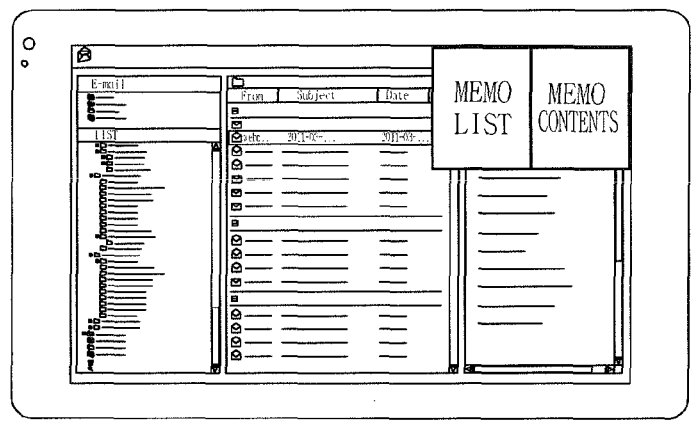

According to another embodiment, FIG. 10D illustrates multiple memos linked to one screen displayed in a screen-divided form. As shown, the controller 180 displays a memo list on the left side and the memo content on the right side. When the user selects a specific memo from the memo list, the controller 180 enlarges the display of the corresponding message contents.

Figure 10E:
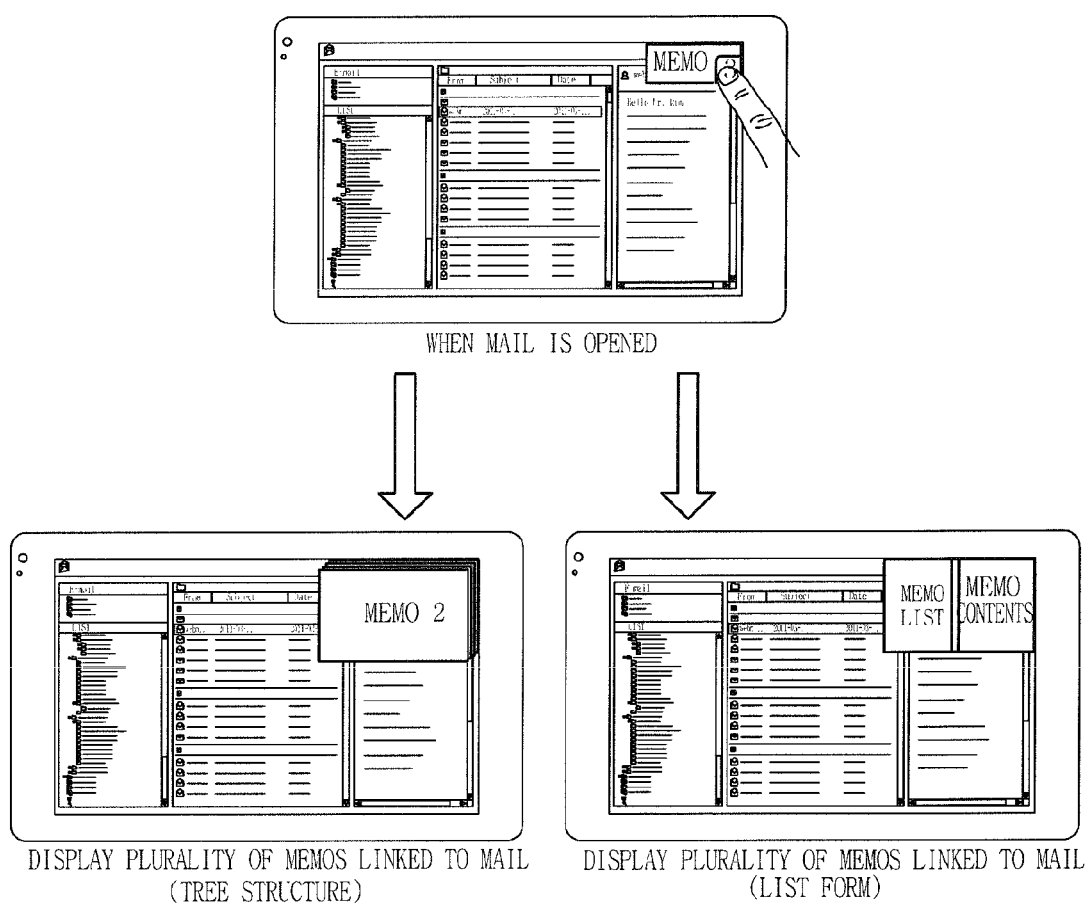

According to still another embodiment, FIG. 10E illustrates displaying only the number of multiple linked memos. This embodiment is particular advantageous because it maximizes the use of the limited size screen. When the user touches the number of the relevant memos, the controller 180 can display the multiple memos in the form illustrated in FIG. 10C or 10D. Further, the methods of FIGS. 10C and 10D may be selectively displayed according to the number of the linked memos. For example, the method of FIG. 10C can be used when the number of the linked memos is no greater than 5, and the method of FIG. 10D can be used when the number of the linked memos is greater than 5. A scroll bar can also be displayed for the memo list and memo content.

Further, in an embodiment of the present invention, when the user selects a relevant memo linked to a video screen, the controller 180 can play a video from the timing point when the relevant memo was written.

Memo Transmission

The written and stored memo can also be transmitted to another user. Further, the memo may be transmitted together with a specific file, and the file may include an e-mail, a text, and a video file as described above. The memo may also be transmitted through an e-mail, SMS, MMS, or SNS, for example.

Also, if a memo is related to a web page when transmitting the relevant memo, the controller 180 can automatically include alarm information for the relevant application (e.g., web page URL), and the play time can be indexed when it is related to a video. In particular, because location information is included in the memo, the video is started at the receiving side where the memo is located.

Further, for multiple messages linked to a single content, the controller 180 can first ask the user if they want to transmit all or only some of the memos. The controller 180 can also provide the user with options for selecting one or more of the multiple messages to be transmitted to the other user.

Figure 11:
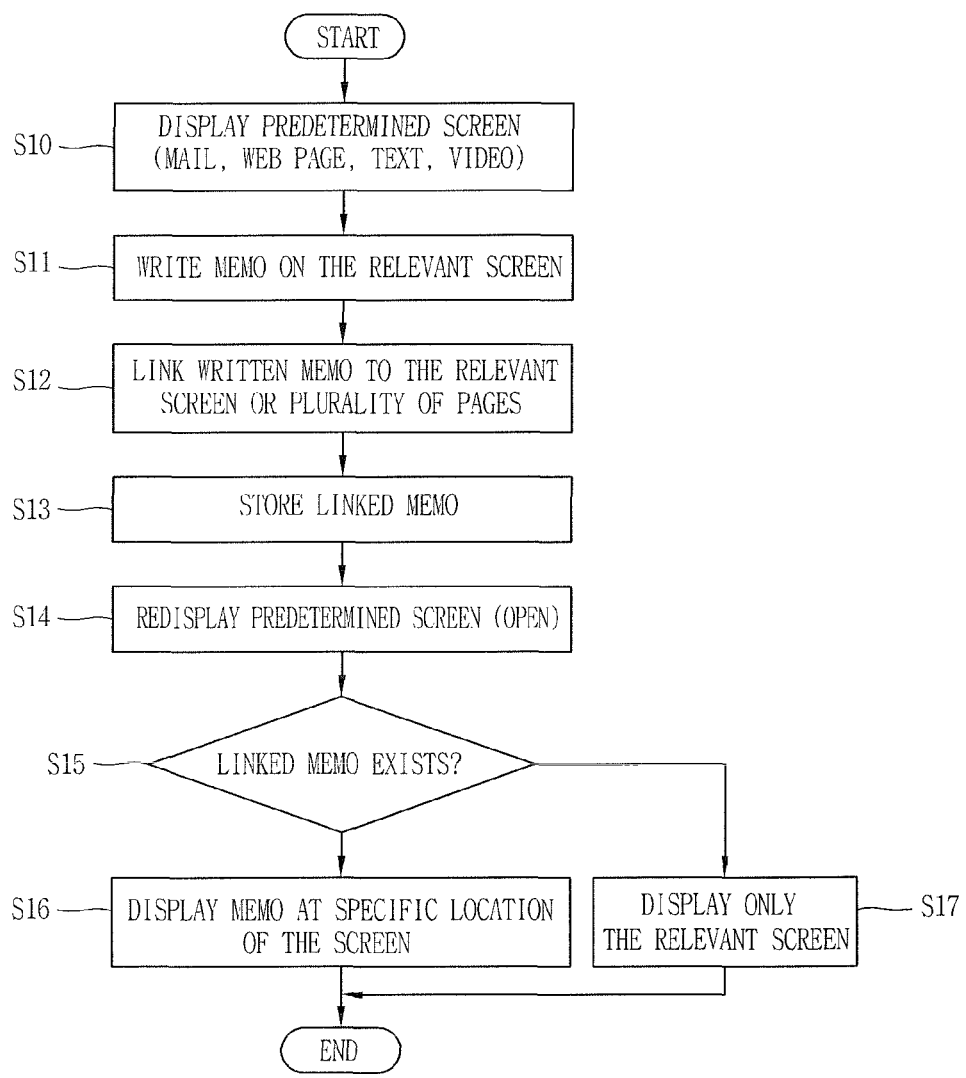
FIG. 11 is a flow chart illustrating a memo management method in a mobile terminal according to an embodiment of the present invention.

Next, FIG. 11 is a flow chart illustrating a memo management method in a mobile terminal according to an embodiment of the present invention. As illustrated in FIG. 11, the controller 180 displays one of a received e-mail, web page, e-book and video/TV screen on the display unit 151 (S10). That is, the user can check an e-mail, perform web surfing, read an e-book, view video/TV, and the like.

When the user wants to write a memo regarding content currently being displayed, the user can select a memo menu from the user menu. The controller 180 then displays the memo writing window 50 that the user can use to write a memo (S11). When the user has completed writing the memo, the controller 180 links the relevant memo to one or more pages using the foregoing link method (S12).

The controller 180 can also store the linked memo (S13), For example, if the user selects a store button without linking the relevant memo in step S11, the controller 180 can automatically link the relevant memo to a current display screen and then store the memo and linked page in the memo box of the memory 160 in step S13.

Thereafter, if the user closes a relevant screen and then reopens the relevant screen (e-mail, web page, e-book and video/TV) (S14), the controller 180 determines if a memo is linked to the relevant screen (S15). If a memo or memos is linked to the relevant screen (Yes in S15), the controller 180 reads the relevant memo from the memo box and displays the read memo (or memos) together with the screen on the display unit 151 (S16). If a memo or memos is not linked to the relevant screen (No in S15), the controller 180 only displays the relevant screen (S17). Further, as discussed above, the controller 180 can store or save the memo in a memo+file form and transmit the memo+file to another user using SMS, MMS, e-mail and SNS.

Thus, the user can advantageously create and link written memos in real time for an e-mail, web page, text, video screen, etc.

Furthermore, according to an embodiment of the present invention, the foregoing method may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented via the Internet. The computer may include the controller 180 of the mobile terminal 100.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile terminal, the method comprising:

executing, via a controller of the mobile terminal, an application;

displaying, via a display unit of the mobile terminal, an execution screen including information output by the executing application, the execution screen including one of a received e-mail, web page, e-book and video/TV screen;

displaying, via the display unit, a memo writing window on a portion of the execution screen;

displaying, via the display unit, a memo menu associated with the memo writing window, said memo menu including a link memo option for linking the memo to the information displayed in the display screen;

receiving, via the controller, a memo created by a user and input in the memo writing window by the user;

linking, via the controller, the memo to at least one display screen in response to the input of the user, the at least one display screen including the execution screen and another display screen;

storing, via a memory of the mobile terminal, the memo and linking information related to the at least one display screen;

automatically displaying the memo related to the at least one display screen based on the stored linking information on the at least one display screen when the at least one display screen having the memo is re-displayed;

wherein the linking the memo to at least one display screen comprises:

outputting a message indicating whether the memo is to be linked to another display screen when the execution display screen is changed to another display screen; and selectively linking the memo to another display screen according to a user response with respect to a message.

2. The method of claim 1, wherein the application executed on the mobile terminal is at least one of an e-mail application, a web page application, an e-book application, and a video/TV application.

3. The method of claim 1, wherein the storing step comprises:

receiving a storing signal requesting the memo be stored in the memory; and automatically linking the memo to the information displayed in the display screen upon receiving the storing signal.

4. The method of claim 1, wherein said memo menu further including a delete memo option for deleting the memo, a clipboard memo option for moving the memo to a clipboard, and an add memo option for adding links to stored memos.

5. The method of claim 4, wherein when the link memo option is selected, the method further comprises hierarchically displaying the memo and a plurality of pages linked to the memo, and wherein when the add memo option is selected, the method further comprises displaying a list of stored memos and a list of linked information in a screen-divided form.

6. The method of claim 1, wherein the information displayed in the display screen includes a plurality of information screens, and wherein the storing step links the memo to each of the plurality of information screens or a selected one or more of the plurality of information screens.

7. The method of claim 1, further comprising:

providing a menu option for modifying contents of the memo and for changing the linking of the memo with the information on the display screen;

modifying the memo using the memo option;

providing a prompt asking whether the modified memo is to be applied to another display screen when the memo to be modified is linked to a plurality of pages; and selectively modify the memo for all or only some screens linked according to a user response with respect to the prompt.

8. The method of claim 1, wherein the storing step stores the memo and linked information in a file+memo form when the linked information is text or an e-mail, and stores the memo and linked information in a captured image+memo form when the linked information is a video/TV screen.

9. The method of claim 1, further comprising:

displaying the memo and linked information as a thumbnail or icon with a particular text color and background color to identify a type of the linked information.

10. The method of claim 1, further comprising:

displaying a timeline indicating a playing time of a video signal being displayed on the display screen, said video signal corresponding to the linked information; and displaying a memo indication on the timeline indicating when the memo was linked to the video.

11. The method of claim 1, further comprising:

reducing a size of the displayed memo to a folded form to include only a subject of the memo based on a received double touch action of the displayed memo; and increasing the size of the displayed memo to its original form based on a received double touch action on the folded form of the memo.

12. The method of claim 1, further comprising:

transmitting, via a wireless communication unit, the memo and information to at least one other terminal using at one of an e-mail, SMS, MMS, or SNS.

13. The method of claim 1, wherein the linking information is an address to re-display at least a portion of the information of the display screen.

14. The method of claim 1, wherein the memo is automatically displayed on the display unit on a relevant date when the stored linking information is related to a schedule or alarm function having the relevant date.

15. A mobile terminal, comprising:

a wireless communication unit configured to wirelessly communicate with at least one other terminal;

a display unit configured to display an execution screen including information output by executing an application, and to display a memo writing window on a portion of the execution screen, and display a memo menu associated with the memo writing window, said memo menu including a link memo option for linking the memo to the information displayed in the execution screen, the execution screen including one of a received e-mail, web page, e-book and video/TV screen; and a controller configured to:

receive a memo created by a user and input in the memo writing window by the user, link the memo to at least one display screen in response to the input of the user, the at least one display screen including the execution screen and another display screen, store the memo and a linking information related to the at least one display screen in a memory of the mobile terminal, automatically display the memo related to the at least one display screen based on the stored linking information on the execution screen when the at least one display screen having the memo is re-displayed, output a message indicating whether the memo is to be linked to another display screen when the execution display screen is changed to another display screen, and selectively link the memo to another display screen according to a user response with respect to the message.

16. The mobile terminal of claim 15, wherein the application executed on the mobile terminal is at least one of an e-mail application, a web page application, an e-book application, and a video/TV application.

17. The mobile terminal of claim 15, wherein the controller is further configured to receive a storing signal requesting the memo be stored in the memory, and to automatically link the memo to the information displayed in the display screen upon receiving the storing signal.

18. The mobile terminal of claim 15, wherein said memo menu further includes a delete memo option for deleting the memo, a clipboard memo option for moving the memo to a clipboard, and an add memo option for adding links to stored memos.

19. The mobile terminal of claim 18, wherein when the link memo option is selected, the display unit is further configured to hierarchically display the memo and a plurality of pages linked to the memo, and wherein when the add memo option is selected, the display unit is further configured to display a list of stored memos and a list of linked information in a screen-divided form.

20. The mobile terminal of claim 15, wherein the information displayed in the display screen includes a plurality of information screens, and wherein the controller is further configured to link the memo to each of the plurality of information screens or a selected one or more of the plurality of information screens.

21. The mobile terminal of claim 15, wherein the controller is further configured to provide a menu option for changing contents of the memo and for modifying the linking of the memo with the information on the display screen, to modify the memo using the menu option, and to provide a prompt asking whether the modified memo to be modified is to be applied to another display screen when the memo is linked to a plurality of pages.

22. The mobile terminal of claim 15, wherein the controller is further configured to store the memo and linked information in a file+memo form when the linked information is text or an e-mail, and to store the memo and linked information in a captured image+memo form when the linked information is a video/TV screen.

23. The mobile terminal of claim 15, wherein the display unit is further configured to display the memo and linked information as a thumbnail or icon with a particular text color and background color to identify a type of the linked information.

24. The mobile terminal of claim 15, wherein the display unit is further configured to display a timeline indicating a playing time of a video signal being displayed on the display screen, said video signal corresponding to the linked information, and to display a memo indication on the timeline indicating when the memo was linked to the video.

25. The mobile terminal of claim 15, wherein the display unit is further configured to reduce a size of the memo to a folded form to include only a subject of the memo based on a received double touch action of the memo, and to increase the size of the memo to its original form based on a received double touch action on the folded form of the memo.

26. The mobile terminal of claim 15, wherein the wireless communication unit is further configured to transmit the memo and information to said at least one other terminal using at one of an e-mail, SMS, MMS, or SNS.

27. The mobile terminal of claim 15, wherein the linking information is an address to re-display at least a portion of the information of the display screen.

28. The mobile terminal of claim 15, wherein the controller is further configured to automatically display the memo on the display unit on a relevant date when the stored linking information is related to a schedule or alarm function having the relevant date.

* * * * *